US005686900A

United States Patent [19]

Ono et al.

[11] Patent Number: 5,686,900

[45] Date of Patent: Nov. 11, 1997

[54] SELECTIVE CALLING RECEIVER WITH MESSAGE DISPLAY FUNCTION

[75] Inventors: Hiroshi Ono, Tokyo; Kuniaki Koga, Shizuoka, both of Japan

[73] Assignee: NEC Corporation, Tokyo, Japan

[21] Appl. No.: 408,692

[22] Filed: Mar. 21, 1995

[30] Foreign Application Priority Data

Mar. 22, 1994 [JP] Japan .................................... 6-050829

[51] Int. Cl.$^6$ ................................ G08B 5/22; H04B 7/00

[52] U.S. Cl. ..................................... 340/825.44; 455/38.1; 455/38.4

[58] Field of Search ......................... 340/825.44, 825.47, 340/825.69, 825.72; 455/38.1, 38.4

[56] References Cited

U.S. PATENT DOCUMENTS 5,430,440 7/1995 Shim .................................. 340/825.44
5,453,739 9/1995 Kuramatsu .......................... 340/825.44
5,471,204 11/1995 Kudoh et al. ...................... 340/825.44

FOREIGN PATENT DOCUMENTS 288120 11/1989 Japan .
198537 8/1991 Japan .
286429 10/1992 Japan .
2 253 729 9/1992 United Kingdom .
WO93/09520 5/1993 WIPO .

OTHER PUBLICATIONS

Patent Abstracts of Japan, vol. 15, No. 464 (E-1137), Nov. 25, 1991 & JP-A-03 198537, Aug. 29, 1991.

Patent Abstracts of Japan, vol. 14, No. 70 (E-0886), Feb. 8, 1990 & JP-A-01 288120, Nov. 20, 1989.

Patent Abstracts of Japan, vol. 12, No. 146 (E-605), May 6, 1988 & JP-A-62 261235, Nov. 13, 1987.

*Primary Examiner*—Michael Horabik
*Assistant Examiner*—Anthony A. Asongwed
*Attorney, Agent, or Firm*—Scully, Scott, Murphy & Presser

[57] ABSTRACT

A selective calling receiver detects a message contained in the received selective calling signal and a message identification code given to this message. A counter counts the number of messages for each message identification code and generates the count value, and the messages and said count value are stored in a memory. When the messages stored in the memory are displayed, the message having the message identification code whose count value is greater is first displayed. Continuously, the message of the message identification number is displayed in order of a greater count value.

13 Claims, 6 Drawing Sheets

| IDENTIFICATION CODE | | CLASSIFICATION | |
|---|---|---|---|
| A | B | | |
| 0 | 0 | ID NUMBER | |
| 0 | 1 | MESSAGE ID CODE | CALLER CODE |
| 1 | 0 | MESSAGE ID CODE | IMPORTANT CALL ID CODE |
| 1 | 1 | MESSAGE ID CODE | AREA ID CODE |

FIG.3

| ADDRESS | MESSAGE | ADDRESS | MESSAGE | • • • • | ADDRESS | MESSAGE |
|---|---|---|---|---|---|---|
| A11 | M11 | A21 | M21 | | AM1 | MM1 |
| A12 | M12 | A22 | M22 | | AM2 | MM2 |
| : | : | : | : | | : | : |
| : | : | : | : | | : | : |
| : | : | : | : | | : | : |
| A1z | M1z | A2z | M2z | | AMz | MMz |

FIG.6

| CALLER | MESSAGE NO. | RAM ADDRESS | COUNT VALUE | READ ORDER |
|---|---|---|---|---|
| #1 | 2 | 1002 | 2 | ⑤ |
| | 1 | 1001 | | ④ |
| #2 | 1 | 2001 | 1 | ⑥ |
| #3 | 3 | 3003 | 3 | ③ |
| | 2 | 3002 | | ② |
| | 1 | 3001 | | ① |

FIG.7

SELECTIVE CALLING RECEIVER WITH MESSAGE DISPLAY FUNCTION

BACKGROUND OF THE INVENTION

1. Field of the Invention

The present invention relates to a selective calling receiver, and more particularly to a selective calling receiver with a message display function.

2. Description of the Related Art

A selective calling receiver, such as a pager, stores a received message and displays the stored message onto its display by the operation of a user. When there are a large number of messages stored, it takes a time to read out a message the user desires. The message the user desires is an important message, for example.

Then, a technique of adding a specific mark to a message that a caller considers very important is described in, for example, Japan Laid-Open Patent Application No. 198537/1991 (JP-A-03-198537). In this paper there is also disclosed a technique in which a receiver adds various specific marks to messages in accordance with the importance of the messages. In this technique the message to which a mark whose importance is high was added is first displayed.

In the former technique disclosed in this paper, however, whether the message is important or not is simply decided by the judgment of a caller. In the latter technique, a person who receives a message has to input a mark each time the message is received.

On the other hand, in Japan Laid-Open Patent Application No. 288120/1989 (JP-A-01-288120) there is described a multi-address selective calling receiver for displaying messages in order of addresses corresponding to different kinds of information sources. Also, in Japan Laid-Open patent Application No. 286429/1992 (JP-A-04-286429) there is disclosed a selective calling receiver for displaying a message in accordance with the priority order of predetermined addresses.

The disclosed techniques of these papers, however, can be utilized only in the multi-address selective calling receiver. Moreover, the caller or receiver must give priority order to the message or address. Also, the caller or receiver has to judge the importance of the message or address.

Further, in a case where the receiver stores a message without seeing it, even if that message were an urgent one, it would take a time to display that message if it had an address whose priority order is low.

SUMMARY OF THE INVENTION

An object of the present invention is to provide a selective calling receiver which is capable of deciding the read priority order of a message in accordance with the reception status of the message.

Another object of the present invention is to provide a selective calling receiver which is capable of displaying a message in accordance with the reception status of the message in order of important message.

Still another object of the present invention is to provide a selective calling receiver which is capable of deciding the importance of a message in accordance with the frequency in reception of the message.

A selective calling receiver of the present invention includes a detector for detecting messages and message identification codes given to the messages, a counter for counting the number of the messages for each of the message identification codes and generating a count value, a memory for storing the messages and the count value, and a display for displaying the messages. When the stored messages are displayed, a message having the message identification code whose count value is greater is first displayed.

In accordance with the present invention, the selective calling receiver decides that the messages from a caller having a larger reception number of messages are important messages. The selective calling receiver according to the present invention displays messages on the display in order of important message. In other words, the messages whose number of receptions is greater are first displayed.

Therefore, the importance of a message is decided not by the simple priority order of each sender but by the reception number of messages from the same caller, so the priority order can be changed according to the reception frequency.

In addition, the importance can be decided for each caller.

BRIEF DESCRIPTION OF THE DRAWINGS

These and other objects, features and advantages of this invention will become more fully apparent from the following detailed description taken with the accompanying drawings in which:

FIG. 3 is a diagram showing the correspondence of an identification code to the following data;

FIG. 6 is a diagram showing the address map in the RAM of FIG. 1; and

FIG. 7 is a diagram used to explain the management method of a message in the RAM and control unit shown in FIG. 1.

In the drawings, the same reference numerals denote the same structural elements.

DESCRIPTION OF THE PREFERRED EMBODIMENTS

Figure 1:
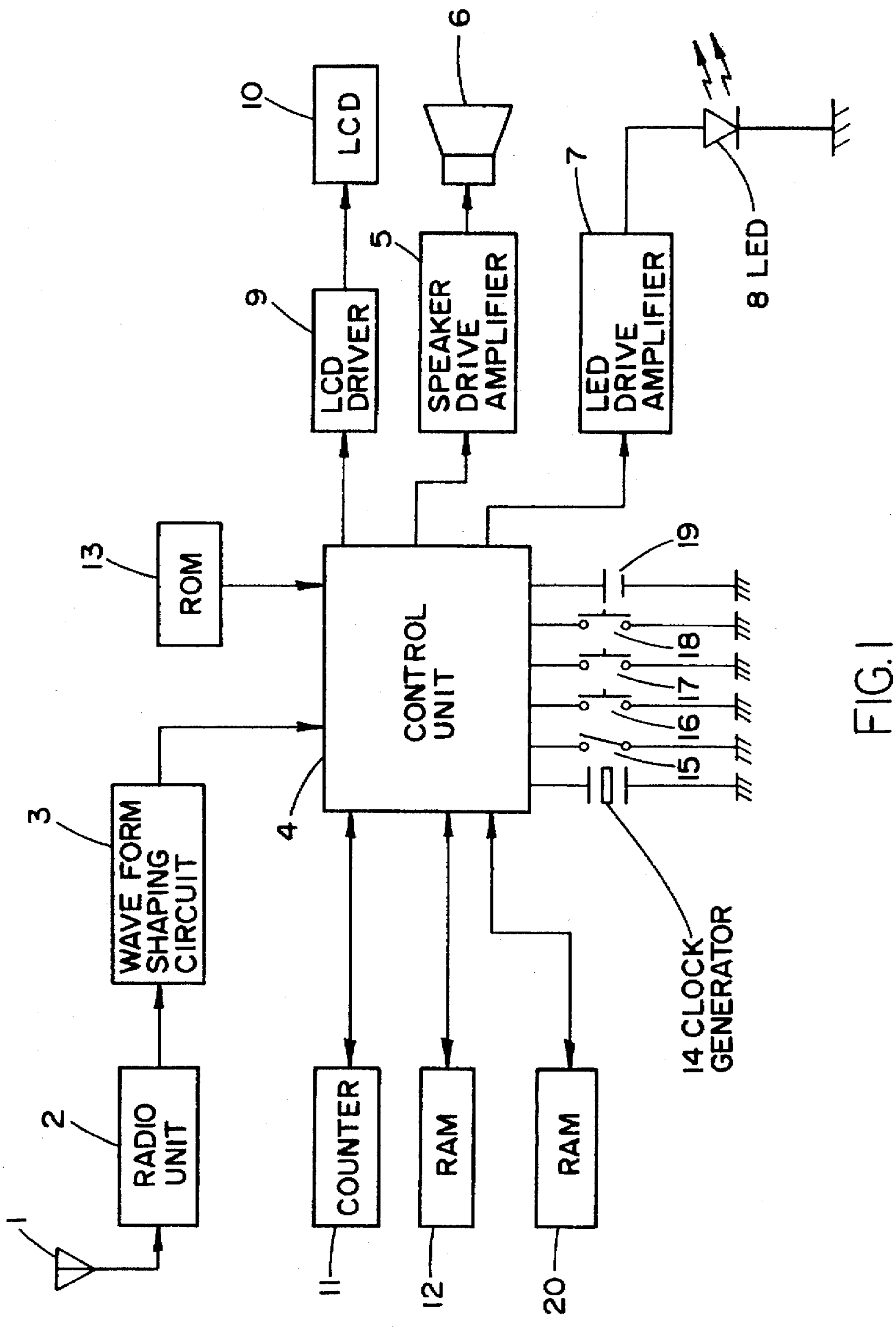
FIG. 1 is a block diagram showing an embodiment of the present invention.

FIG. 1 is a block diagram showing an embodiment of the present invention.

In the figure, a selective calling receiver, such as a pager, has an antenna 1, a radio unit 2, a waveform shaping circuit 3, a control unit 4, a speaker drive amplification circuit 5, a speaker 6, a light emitting diode (LED) drive amplification circuit 7, an LED 8, a liquid crystal display (LCD) driver 9, an LCD 10, a counter 11, a random access memories (RAMs) 12 and 20, a read-only memory (ROM) 13, a clock generator 4, a variety of switches 15 through 18, and a power supply 19. A radio unit 2 receives a selection calling signal from a radio base station (not shown) through the antenna 1.

Figures 2A, 2B, 2C:
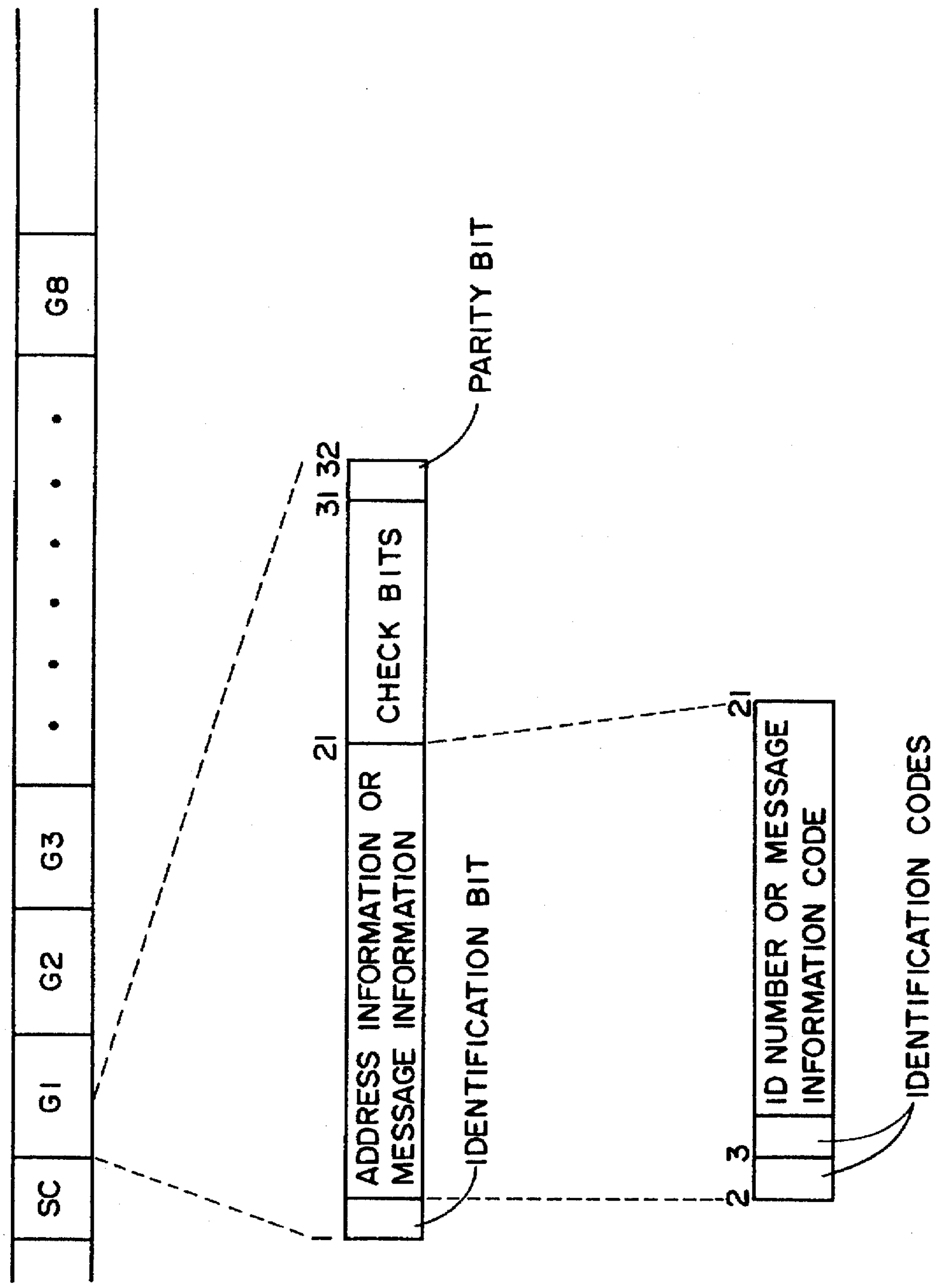
FIGS. 2(*a*) to 2(*c*) are diagrams showing the signal format of a selective calling signal, respectively.

FIGS. 2(*a*) to 2(*c*) show the signal format of the selective calling signal. In the figures the signal format by POCSAG is shown by way of example. In FIG. 2(*a*) the selective calling signal includes a synchronization code SC and a plurality of groups G1 to G8. Each group consists of two cord words. In FIG. 2(*b*) one of the cord words is shown. Each code word has 32 bits and consists of one identification bit, 20 data bits, 10 check bits, and one parity bit. The identification bit is used to identify whether the following data is address information or message information. For example, if the identification bit is a 0, the following data will be the address information, and if the identification bit is a 1, the following data will be the message information. FIG. 2(*c*) shows the signal format as the following data is address information. By a 2-bit identification code, it is identified whether the following 18-bit data is an identification (ID) number of a receiver or a message identification code. The message identification code is a caller identification number for identifying the caller of a selective calling signal, an important call identification code for identifying the importance of a message, or an area identification code in multi-area service, for example.

FIG. 3 is a diagram showing the correspondence of the identification code to the following data. When the 2-bit identification code is 00, the data represents the ID number, and when the code is not 00, the data represents one of the message identification code. More particularly, when the identification code is 01, the data represents the caller identification number. When the identification code is 10, the data represents the important call identification code. When the identification code is 11, the data represents the area identification code.

Returning back to FIG. 1, the radio unit 2 amplifies and demodulates the received selective calling signal and supplies the demodulated signal to the waveform shaping circuit 3. The waveform shaping circuit 3 waveform-shapes the demodulated signal and supplies the waveform-shaped digital signal to the control unit 4.

The control unit 4 decodes the waveform-shaped digital signal at the timing of a timing clock from the clock generator 14 and extracts the ID number, the message, and the message identification code from the decoded digital signal. The extracted ID number, i.e., the calling number contained in the selective calling signal is compared in the control unit 4 with an ID number prestored in the ROM 13. If the extracted calling number matches with the ID number in the ROM 13, the control unit 4 will execute notification control.

In the notification control the control unit 4 drives the speaker drive amplification circuit 5 and the LED drive amplification circuit 7 to sound the speaker 6 and light the LED. The control unit 4 also stores the extracted message in the RAM 12. Thereafter, the control unit 4 drives the LCD driver 9 to display the stored message on the LCD 10.

The power supply 19 supplies power to each element in the selective calling receiver. A power supply switch 15 executes the on-off control of the power from the power supply 19 to each element. A read switch 16 is a switch for reading out the message stored in the RAM 12. A scroll switch 17 is a switch for scrolling the message displayed on the LCD 10. A reset switch 18 is a switch for resetting the message displayed on the LCD 10 and stopping the sound of the speaker 10.

For the above-described storage of the messages to the RAM 12, in the present invention the messages are classified according to each message identification code, for example, and then stored. The stored messages are displayed according to each message identification code on the LCD 10. The caller identification number, the address of the RAM 12 at which the message was stored, and the reception order of the message for each caller are stored in the RAM 20 in correspondence with one another.

The message classification and message display operation of the present invention will hereinafter be described with reference to the case where the message identification code is the caller identification number for identifying a caller.

The counter 11 counts the messages extracted in the control unit 4 for each caller identification number. The control unit 4 classifies the messages in accordance with each caller identification number and stores the classified message to the RAM 12. The control unit 4 stores the count value of the counter 11, i.e., the number of messages for each caller identification number to the RAM 20. As a result, the control unit 4 can detect a caller having a large number of message transmissions and also the transmitted messages.

If the read switch 16 is pressed by a user, the control unit 4 will compare the count value of each caller identification number stored in the RAM 20. The control unit 4 then reads the messages of the caller identification number whose count value is maximum from the RAM 12, and displays the read messages onto the LCD 10. Now, the messages from the same caller, for example, are read out in order of old reception time by pushing down the scroll switch 17. If all messages from the caller having a maximum count value are read out, the messages of a caller having the next greatest count value will be read out.

The messages are thus read out in order of a caller having a greater count value, so a message will be displayed earlier if it is a more important message.

As described, the present invention decides whether the stored messages are important or not by counting the number of messages for each message identification code. The messages from a caller having a greater count value, therefore, is earlier displayed as important messages on the LCD 10.

Figure 4:
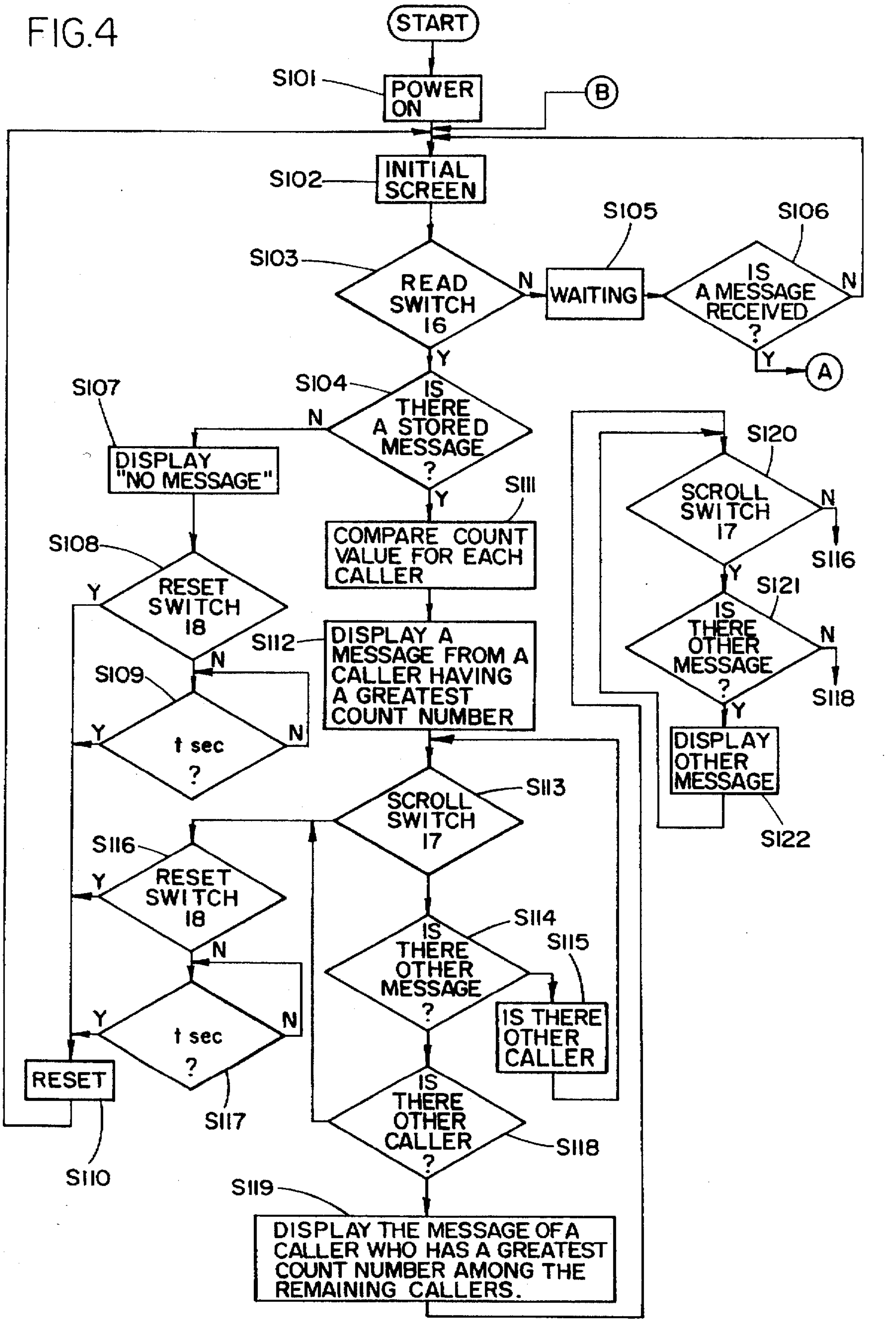
FIGS. 4 and 5 are flowcharts showing a sequence of operations as to the storage and display of a message received, respectively.
Figure 5:
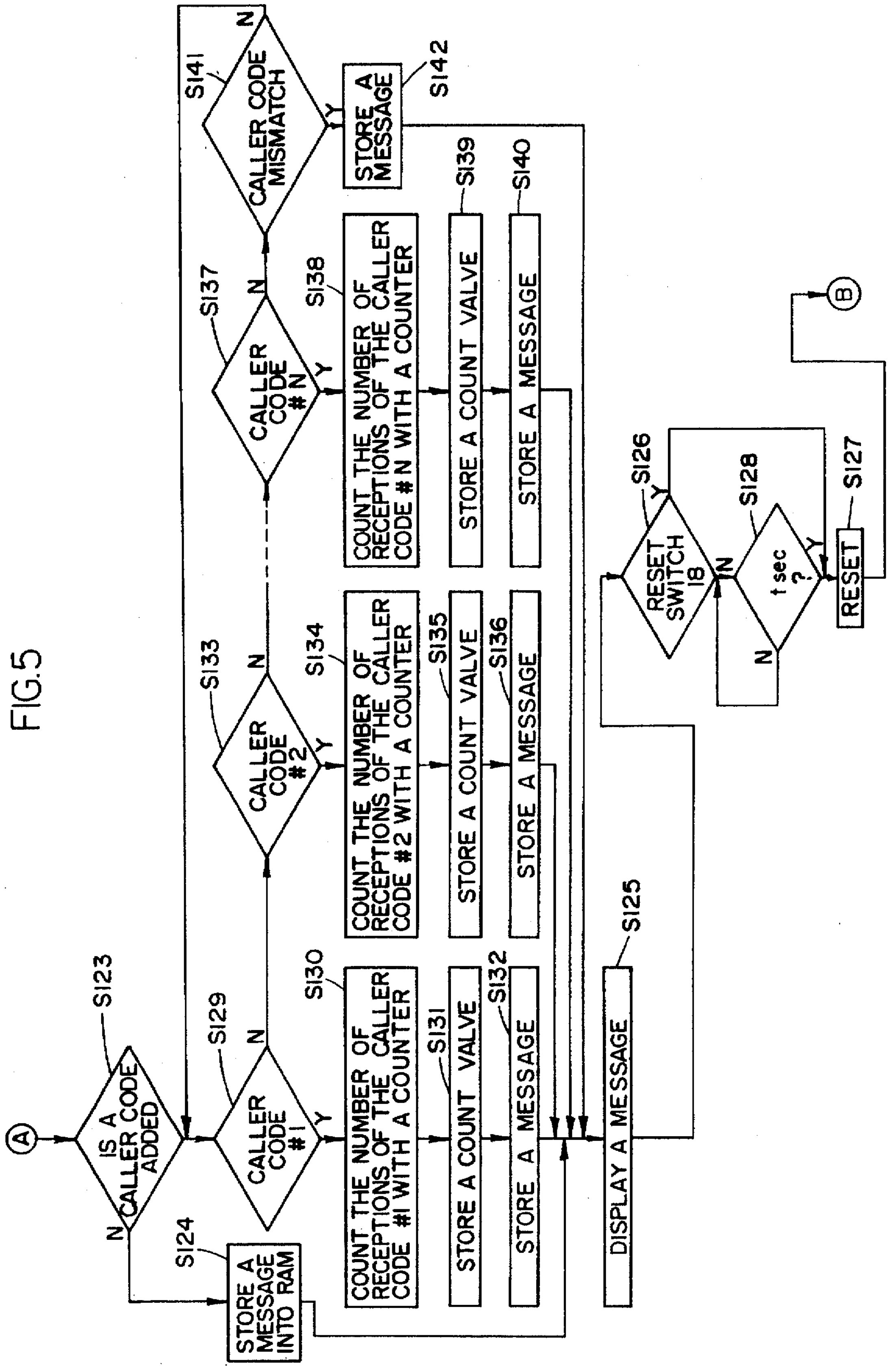

Next, the storage and display of the messages which are the characteristic of the present invention will be described in detail with reference to FIGS. 4 through 7. FIGS. 4 and 5 are flowcharts showing a sequence of operations as to the storage and display of the messages.

In FIG. 4, if the power supply switch 15 is pushed down, power will be supplied from the power supply 19 to each circuit (step S101). If power is supplied to the control unit 4, it will display on the LCD 10 an initial screen showing, for example, current time (step S102). If the read switch 16 is pressed by a user (step S103), the control unit 4 will check whether a message has been stored in the RAM 12 or not (step S104). This is executed by detecting the count value of each caller stored in the RAM 20, for example. If in step S103 the read switch 16 is not pressed, the selective calling receiver will be in a reception waiting state of the selective calling signal (step S105). If the selective calling signal is not received (step S106), the initial screen display state will be maintained. That is, step S106 returns back to step S102.

If in step S104 there is not a message that has been stored, the control unit 4 will display on the LCD 10 the display showing that there is no stored message, such as "NO MESSAGE." Thereafter, if the reset switch 18 is depressed within a predetermined period of time t sec (step S108), a reset signal will be input to the control unit 4. In response, the control unit 4 resets the display of "NO MESSAGE" displayed on the LCD 10 (step S110). If the reset switch 18 is not pressed after the lapse of t sec (step S109), the control unit 4 will reset the display on the LCD (step S110). After the resetting in step S110, the control unit 4 displays the initial screen on the LCD 10 (step S102).

If, on the other hand, in step S104 a stored message exists, the control unit 4 will compare the count value counted for each caller (step S111). The count value of each caller has been stored in the RAM 20. Thereafter, the control unit 4 reads from the RAM 12 the messages from a caller having a maximum count value, and displays on the LCD 10 a message first received, for example (step S112). If the scroll switch 17 is pressed by the user (step S113), the control unit 4 will check whether there is other message of the same caller or not (step S114). If other message exists, the control unit 4 will display the message new next to the first message (step S115). The operation of steps S113 through S115 are repeated.

If in step S113 the reset switch 18 is pressed instead of the scroll switch 17 (step S116), a reset signal will be supplied from the reset switch 18 to the control unit 4 (step S110). In response, the control unit 4 displays the initial screen on the LCD 10 (step S102). If the scroll switch 17 and the reset switch 18 are not both pressed, the control unit 4 will display the initial screen on the LCD 10 after the lapse of t sec (step S102).

If in step S114 there is no other message of the same caller, the control unit 4 will check whether there is other caller or not (step S118). This is checked by the count value stored in the RAM 20, for example. If there is other caller, there will be selected a caller who has the maximum count value among callers who have not been displayed during this sequence of read operations. The control unit 4 reads out the messages from this caller, and displays on the LCD 10 a message first received, for example (step S119). Thereafter, if the scroll switch 17 is pressed (step S120), the control unit 4 will check whether there is other message of the same caller or not (step S121). If there is other message, the control unit 4 will display the message received next to the first message (step S122).

If in step S121 there is no other message of the same caller, the flow will return back to step S118.

When in step S118 there is no message from other caller and in step S120 the scroll switch 17 is not pressed, the control unit 4 checks whether the reset switch 18 was pressed or not (step S116). If the reset switch 18 is pressed, the control unit 4 will display the initial screen (step S102).

If in step S106 the selective calling receiver receives a message, it will perform the reception process of the message. More particularly, the flow advances to FIG. 5. In step S123, the control unit 4 checks whether the received message has a caller identification number or not. This is checked by whether the message identification code shown in FIG. 2(*c*) has the caller identification code shown in FIG. 3 or not. If the caller identification number is not included in the message identification code, the message will be stored in another address in the RAM 12 different from the address of the message the caller identification number has (step S124). This stored message is then displayed on the LCD 10 (step S125). If the reset switch 18 is pressed (step S126), a reset signal will be input to the control unit 4 (step S127) and the initial screen will be displayed on the LCD 10 (step S102). If the reset switch 18 is not pressed, the reset signal will be input after the lapse of t sec (step S127).

If in step S123 the caller identification number is detected, it is checked which of the caller identification numbers stored in the RAM 20. If the received caller identification number matches with a first caller identification number stored, such as "#1" (step S129), the count value of "#1" will be incremented in the counter 11 (step S130). A new count value is stored in the RAM 20 (step S131), and the message is stored in the RAM 12 (step S132).

If in step S129 the received caller identification number does not match with the first caller identification number, it will be compared with a second caller identification number stored. If the received caller identification number matches with the second caller identification number stored, such as "#2" (step S133), the count value of "#2" will be incremented in the counter 11 (step S134). A new count value is stored in the RAM 20 (step S135), and the message is stored in the RAM 12 step S136).

Thus, the received caller identification number is compared until it matches with any of the stored caller identification numbers. If the received caller identification number does not match with any of the stored caller identification numbers (step S141), the message will be stored in the RAM 12 without performing the count operation (step S142) and displayed on the LCD 10 (step S125).

If the received caller identification number matches with an Nth caller identification number, such as "#N" (step S137), the count value of "#N" will be incremented in the counter 11 (step S138). A new count value is stored in the RAM 20 (step S139), and the message is stored in the RAM 12 (step S140).

After in steps S132, S136, and S140 the messages have been stored in the RAM 12, these messages are displayed on the LCD 10, respectively (S125).

FIG. 6 illustrates the address map in the RAM 12. The addresses A11 to A1z are assigned to the caller identification number "#1," and the addresses A21 to A2z are assigned to the caller identification number "#2." In this way, the addresses AM1 to AMz are assigned to the caller identification number "#M." Therefore, the received messages are stored for each caller.

FIG. 7 is a diagram used to explain a management method of messages in the RAM 20 and the control unit 4.

In FIG. 7, each caller is given a message number. The addresses in the RAM 12 in which messages were stored corresponds to each message number. The number of messages for each caller is stored as a count value in correspondence with each caller. In this example, the read order of callers is "#3," "#1," and "#2." Also, for the messages of the same caller, the read order of each message is an earlier reception time order.

For example, if there are a plurality of callers and the count values are the same, the priority order may be given to a message earlier received. In such case, the reception time can be stored in the RAM 20 in correspondence with the message number. If the count values of "#1" and "#2" are the same and the message reception time of "#1" is earlier than that of "#2," the message of "#1" will be displayed earlier.

While in the above-described embodiment the messages have been classified and stored for each caller, the present invention is not limited to this, but they may be stored without classification.

Also, the important call identification code or area identification code may be employed instead of the caller identification number.

Further, although in the above-described embodiment the RAM 20 has been provided independently, a memory in the control unit 4 may has the function of the RAM 20. Also, the function of the RAM 20 may be provided in the RAM 12.

As has been described hereinbefore, the importance of a message is decided according to the present invention by the frequency, e.g., count value, in reception of messages, so an important message can be decided with high reliability.

In addition, when the stored message is displayed on the display, the user can see an important message earlier because a message having a message identification code whose count value is greater is first displayed.

Thus, the importance of a message is decided not by the simple priority order of each sender but by the reception number of messages from the same caller, so the priority order can be changed according to the reception frequency.

While the invention has been described with reference to specific embodiments thereof, it will be appreciated by those skilled in the art that numerous variations, modifications, and embodiments are possible, and accordingly, all such variations, modifications, and embodiments are to be regarded as being within the spirit and scope of the invention.

What is claimed is:

1. A selective calling receiver comprising:

a detector for detecting messages and message identification codes given to said messages;

a counter for counting a number of receptions of said messages for each of said message identification codes and generating a count value;

a memory for storing said messages and said count value;

a display for displaying the stored messages; and a control unit for controlling an order of displaying said messages on said display in accordance with said count value.

2. The selective calling receiver as claimed in claim 1, wherein said control unit controls the display of said stored messages in the order of said count value.

3. The selective calling receiver as claimed in claim 1, wherein said message identification code is any one of a caller identification number, an important call identification code, and an area identification code.

4. The selective calling receiver as claimed in claim 1, wherein said order of displaying said messages is from a message having a count value which is greater than count values of remaining messages.

5. The selective calling receiver as claimed in claim 1, further comprising:

a receiving unit for receiving a selective calling signal having one of said messages and said message identification code; and wherein said selective calling signal comprises a synchronization signal and a plurality of groups, and each group comprises an identification bit and a data portion, the identification bit representing whether said data portion is address information or message information.

6. The selective calling receiver as claimed in claim 5, wherein said data portion has an identification code representative of a kind of an identification code which represents whether said address information is a calling number or a message identification code.

7. The selective calling receiver as claimed in claim 6, wherein said detector detects whether said message identification code is contained in said selective calling signal or not, based on said identification code.

8. A selective calling receiver comprising:

a receiving unit for receiving messages;

a memory for storing said messages;

a display for displaying said messages; and control means for displaying said messages on said display in an order in accordance with a reception number of said messages.

9. The selective calling receiver as claimed in claim 8, further comprising:

a counter for counting said reception number of said messages.

10. The selective calling receiver as claimed in claim 9, wherein said control unit displays said messages in an order of said reception number beginning from a message having a reception number which is greater than reception numbers of remaining messages.

11. A method of controlling message display of a selective calling receiver, comprising the steps of:

receiving messages and message identification numbers;

counting a number of receptions of said messages for each of said message identification numbers;

storing said messages and the number of the receptions;

comparing the number of receptions for each message identification number; and displaying said stored messages on a display in order based on the number of receptions for each of said message identification numbers.

12. The control method as claimed in claim 11, wherein messages having an identical message identification number are displayed in an order of a reception time which is earlier than a reception time of remaining messages having the identical message identification number.

13. The control method as claimed in claim 11, wherein messages having an equal number of the receptions are displayed in an order of a reception time which is earlier than a reception time of remaining messages having the equal number of the receptions.

* * * * *